United States Patent [19]

Kromrey

[11] Patent Number: 4,770,835
[45] Date of Patent: Sep. 13, 1988

[54] METHOD FOR MOLDING USING A DUAL SOLID FLOWABLE POLYMER SYSTEM

[75] Inventor: Robert V. Kromrey, Campbell, Calif.

[73] Assignee: United Technologies Corporation, Hartford, Conn.

[21] Appl. No.: 907,947

[22] Filed: Sep. 10, 1986

[51] Int. Cl.⁴ ............................................ B29C 43/10
[52] U.S. Cl. .................... 264/257; 264/29.5; 264/102; 264/316; 264/324; 419/49; 419/68
[58] Field of Search .............. 264/546, 552, 572, 314, 264/316, DIG. 50, 29.5, 313, 325, 500, 544, 570, 102, 257, 324; 100/211; 425/78, 387.1, 405 H, 405 R, 407, DIG. 14, DIG. 44; 419/49, 68

[56] References Cited

U.S. PATENT DOCUMENTS 3,556,201 1/1971 Sander .
3,843,601 10/1974 Bruner .
4,167,430 9/1979 Arachi .
4,264,556 4/1981 Kumar et al. .
4,388,263 6/1983 Prunty .
4,547,337 10/1985 Rozmus .

FOREIGN PATENT DOCUMENTS 2134168 1/1987 Fed. Rep. of Germany .

OTHER PUBLICATIONS

AGM-130 Propulsion Module Proposal 84-32, vol. 3: Cost and Pricing Proposal.
AGM-130 Propulsion Module Proposal 84-32 A.
Reference Reply S4-931-1934.
Space Transportation System Solid Rocket Motor Second Source Study.
Air Force Checks Compatability of Rockwell AGM-130 with F-111.
FAC 84-26, Jul. 30, 1987, Part 2, Definitions of Words and Terms.

Primary Examiner—James Lowe

[57] ABSTRACT

A method of molding an article utilizing two types of solid flowable particulate polymer pressurizing media wherein one medium is protected from thermal degradation by a second medium. The method comprises disposing an article precursor within a pressure vessel and disposing a first solid flowable polymer medium that is substantially thermally stable at temperatures in excess of about 316° C. so that it is capable of transferring a substantially uniform, predetermined medium pressure to the surface of the article precursor. A second solid flowable polymer medium is disposed so that it is capable of transferring a substantially uniform, predetermined medium pressure to the first polymer medium. The second medium is caused to produce a substantially uniform medium pressure so that said pressure is transferred to the surface of the article precursor and the article precursor is exposed to temperatures in excess of about 316° C. The second polymer is protected from thermal degradation by the thermal stability and high insulative capability of the first polymer medium.

4 Claims, 1 Drawing Sheet

U.S. Patent  Sep. 13, 1988  4,770,835
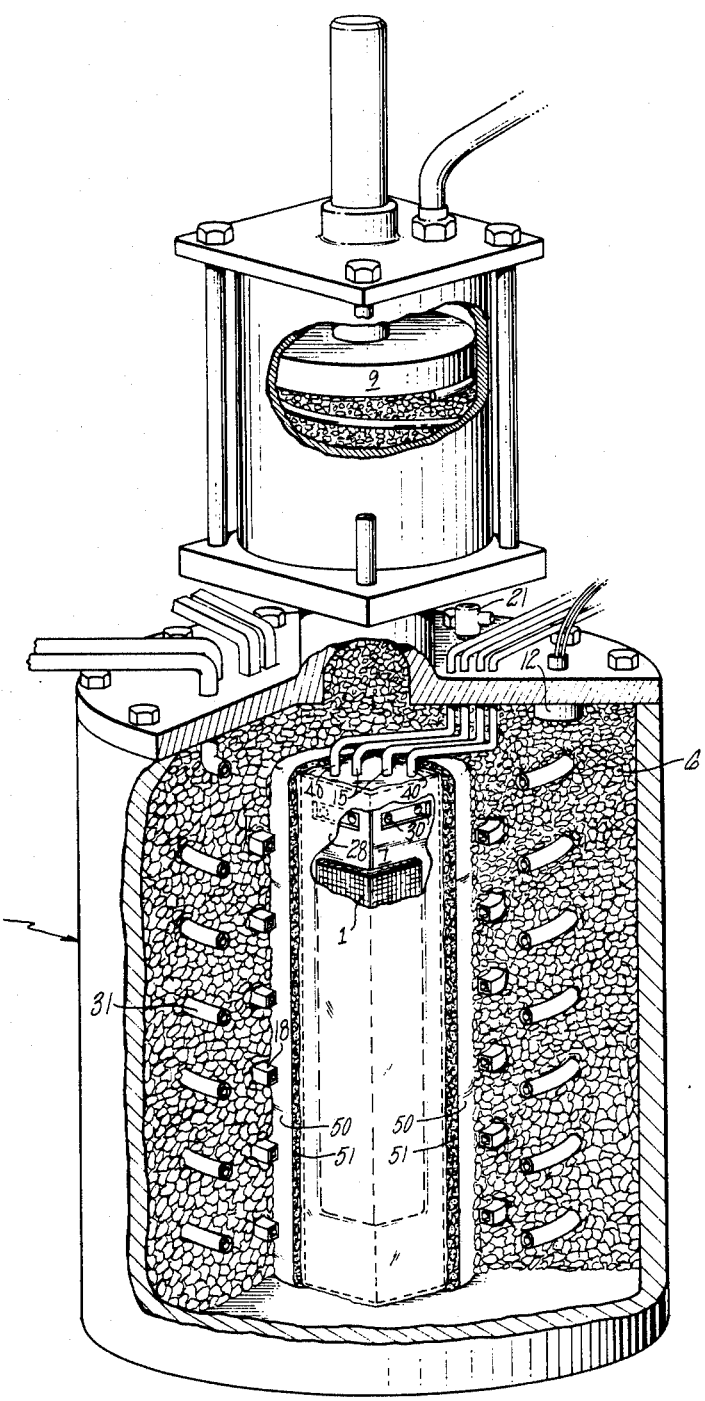

METHOD FOR MOLDING USING A DUAL SOLID FLOWABLE POLYMER SYSTEM

CROSS REFERENCE

This application relates to commonly assigned copending applications Ser. No. 829,048 filed Feb. 13, 1986, entitled "Molding Method and Apparatus Using a Solid, Flowable, Polymer Medium"; and Ser. No. 907,959 entitled "Solid Flowable Polymer Molding Medium"; Ser. No. 907,943 entitled "Solid Flowable Polymer Medium with Metal Additives and Method of Molding Using Same"; Ser. No. 907,946 entitled "High Temperature Solid Flowable Polymer Medium Method of Molding Using Same"; Ser. No. 907,942 entitled "Method for Molding a Carbon-Carbon Composite"; Ser. No. 907,952 entitled "Method for Recovering a Solid Flowable Polymer Medium"; Ser. No. 907,955 entitled "Solid Flowable Medium Having a Thermal Stability Additive and Method for Molding Using Same"; Ser. No. 907,958 entitled "Method of Vacuum Bagging Using a Solid Flowable Polymer"; Ser. No. 907,954 entitled "Improved Method of Fabricating Tubular Composite Structures now U.S. Pat. No. 4,704,240; and Ser. No. 907,957 entitled "Solid Flowable Polymer Medium with U.V. Detectable Additive and Method for Molding Using Same", filed on even date herewith, which disclose material related to that contained herein, the disclosures of which are hereby incorporated by reference.

TECHNICAL FIELD

The field of art to which this invention pertains is methods of molding.

BACKGROUND ART

Composite materials are of great current interest because they provide a very favorable combination of high strength and low density. Typically, a composite material is comprised of fibers of graphite, boron, glass, and the like embedded within an epoxy, phenolic or other polymer resin matrix. The more advanced composites which have particularly favorable high strength to density ratio properties are especially attractive for aerospace applications. But typical of other advanced aerospace materials they present comparative processing difficulties; they cannot be made by a simple layup of the fibers and resin followed by room temperature curing. Aerospace composite materials not only involve more difficult-to-fabricate resins but often essentially defect-free finished parts must be produced. As a result, aerospace composites are typically molded and cured at elevated temperatures under substantial pressure.

Although a variety of molding processes have been used to mold composites at elevated temperatures and pressures (e.g. compression molding, isostatic pressure molding using pressure bags or pressure vessels, pressure pad molding) there are problems (e.g. bag leaks) associated with these processes.

Accordingly, there is a constant search for composite molding processes.

DISCLOSURE OF INVENTION

This invention is directed to a method of molding an article utilizing two types of solid flowable particulate polymer pressurizing media wherein one medium is protected from thermal degradation by a second medium. The method comprises disposing an article precursor within a pressure vessel and disposing a first solid flowable polymer medium that is substantially thermally stable at temperatures in excess of about 316° C. so that it is capable of transferring a substantially uniform, predetermined medium pressure to the surface of the article precursor. A second solid flowable polymer medium is disposed so that it is capable of transferring a substantially uniform, predetermined medium pressure to the first polymer medium. The second medium is caused to produce a substantially uniform medium pressure so that said pressure is transferred to the surface of the article precursor and the article precursor is exposed to temperatures in excess of about 316° C.

This invention makes a significant advance in the field of molding by providing a system that utilizes the thermal stability and high insulative capability of one pressurizing medium to protect a second medium from thermal degradation.

The foregoing and other objects, features and advantages will be apparent from the specification, claims and from the accompanying drawings which will illustrate an embodiment of the invention.

BRIEF DESCRIPTION OF DRAWING

The Figure illustrates a perspective view cutaway of an apparatus for performing the molding method of the present invention by controlling the temperature and pressure of the pressurizing polymer medium.

BEST MODE FOR CARRYING OUT THE INVENTION

The Figure demonstrates schematically a method according to the present invention wherein an article precursor 1 is placed in a pressure vessel 3 (e.g. stainless steel, alloy steel) and surrounded with a polymer medium (medium) 51, optionally containing metal particles to increase the thermal conductivity of the medium as disclosed in commonly assigned copending U.S. application Ser. No. 907,943 entitled "Solid Flowable Polymer Medium with Metal Additives and Method of Molding Using the Same", the disclosure of which is hereby incorporated by reference. It is preferable to have a barrier layer 28 between the medium and the article to avoid contamination of the composite and medium. Unlike a vacuum bag, this layer does not have to be air tight. An exemplary material is conventional aluminum foil. The barrier layer can cover a glass fabric breather layer which is in communication with a vacuum line 40 via gas vent 30. This may be used to remove volatiles from the article. Preferably, two polymer media are used in a coaxial system separated by another barrier layer 50 (e.g. aluminum foil) with the higher temperature medium 6 disposed next to the article precursor and the low temperature medium 51 surrounding the barrier layer 50. Typically, about less than 5.1 centimeters (cm) (two inches) of high temperature medium is sufficient as it has a high insulative capability. Of course more than about 5 cm can be used, if desired. Thinner layers of high cost medium allows greater use of lower cost medium. The medium may be in contact with more or less of the composite precursor as is desired. Typically, the surface area of the composite precursor 1. not in contact with the medium is disposed (e.g. in contact) next to a tool 7 in order to provide (or maintain) a particular shape to the article 1. A pressurizer (e.g. mechanical piston) 9 can apply the requisite, uniformly distributed medium pressure to the article precursor.

However, the pressure is preferably accomplished via the thermal expansion of the low temperature polymer medium 6. Such things as conventional pressure transducers 12 can be inserted in various places within the pressure vessel 3 to detect the requisite pressure. While any pressure can be used with the present invention, typically pressures up to 20.67 MegaPascals (MPa) (3000 pounds per square inch (psi)) are required for molding composite (e.g. carbon-carbon) materials. It is also believed that pressures as high as about 137.88 MPa (20,000 psi) will work.

Resistance heaters 15 and preferably induction heating means 18 are used to form (e.g. cure, carbonize, graphitize, etc.) the article to be molded 1. By raising the temperature of the tool or susceptor the heat is transferred to the article. Preferably, a fluid heating/cooling means 31 is used to change the pressure via the large thermal expansion of the low temperature pressurizing medium. Typically, the temperature used to expand the pressurizing medium is much less than that used to cure the article precursor. Regulation of this pressure increase can be achieved through a relief valve 21, piston 9 and/or fluid heating/cooling means 31. Thus, tubing 31 can be used alternately to heat or cool the medium depending on whether hot or cold fluids are passed through the tubing to control the pressure independently of the temperature in the cure region.

The particular media useful in the present invention is a critical component. Its responsiveness to temperature and pressure coupled with its flowability and solid nature enable it to be useful with the present invention. These properties cause the media to produce an advantageous, substantially uniform, controllable pressure on the surface of the article precursor. And while this material is described in terms of a polymeric meduim, other materials (such as a polymer molten metal mixture) which would have all the characteristics and produce similar results could be substituted. Although a dual media type of pressurizing system can be used as stated below, a plurality of different media could be used to advantage in different systems.

By utilizing two types of medium (a high temperature medium close to the article and a low temperature medium further from the medium) the lower cost low temperature medium can be utilized. If the low temperature medium were placed near the precursor article the higher localized temperatures would effectively degrade the polymer medium. However, the higher temperature medium will function as a pressurizing medium throughout the carbonization step. The high temperature medium is disclosed in commonly assigned copending U.S. application Ser. No. 907,946 entitled "High Temperature Solid Flowable Polymer Medium and Method of Molding Using the Same", the disclosure of which is hereby incorporated by reference. The low temperature medium is disclosed in commonly assigned copending application Ser. No. 907,959 entitled "Solid Flowable Polymer Molding Medium", the disclosure of which is hereby incorporated by reference. Below is a description of the two types of polymer medium beginning with the low temperature medium.

In a typical embodiment of the invention, the polymer is an unfilled silicone rubber particulate of $-4+30$ U.S. mesh sieve size (4.7–0.42 mm), which when pressurized, is sufficiently self-complaint to coalesce as an essentially void-free medium at a pressure of the order of 69 kPa (10 psi).

Typically, a silicone rubber is used as the pressurizing polymer. Most preferably, the rubber is an improvement on the type which is described in U.S. Pat. No. 3,843,601 to Bruner. See also U.S. Pat. No. 4,011,929 to Jeram et al. The disclosures of both patents are hereby incorporated by reference. Generally, the preferred materials are dimethylsilicones that have vinyl groups. They may be produced by conventional commercial procedures, including production from polysiloxanes using various vulcanizing techniques. A preferred material which has been used thus far is the experimental unfilled silicone rubber material designated as X5-8017, formerly No. 6360 81 (more simply 8017 hereinafter), by the Dow Corning Corporation, Midland (Mich.).

Another Dow Corning silicone rubber, No. 93-104, without its ordinary fillers (called "93-104" herein, nonetheless) is useful. The Polygel C-1200 silicone rubber (Stauffer Chemical Company, Westport, Conn.), believed to be essentially the material which is described in the Bruner U.S. Pat. No. 3,843,601 is also useful with the present invention.

While the preferred materials are silicone rubbers, other polymer materials having the desired characteristics can be used. Most silicone rubbers are temperature limited for long term use, e.g. typically up to about 288° C. (550° F.). Fillers and other adulterants can be included with and within the medium, provided the essential behavior properties are maintained.

The preferred 8017 silicone rubber is characterized by low strength and high friability. By "high friability" is meant there is such low strength that moderate size solids tend to disintegrate into smaller particulates when subjected to modest mechanical forces, even rubbing between the fingers. The 8017 material has a Shore A hardness of less than 1 (Shore 00 hardness of 50-55) and compressive strength of the order of 70 kPa when measured on a 2.5 cm square by 1.27 cm thick specimen, and upon a compression deformation of about 40%, it shears into smaller particles. This behavior is contrasted with that of more conventional rubbers which have higher strength, greater resistance to deformation and greater elongation to failure. It has also been observed that preferred polymer useful with the present invention forced through a small orifice, or through a 1.1 cm diameter pipe as described below, has a tendency to disintegrate into smaller particulate. By example, it is found that over time a nominal 30 mesh size powder having about 50 weight percent retained on a 40 mesh screen will change to one having only about 25 weight percent retained on a 40 mesh screen.

The aforementioned behavior of the polymer enables the fabrication of intricately shaped composite polymer parts with uniform properties under the controlled and independent application of a substantially uniform pressure and temperature. In one embodiment of the invention, the polymer has a Shore A hardness of less than about 15, typically less than 8, and desirably less than 1; the compressive strength is less than 1 MPa, and desirably less than 0.2 MPa.

The ability of the inventive medium to flow under molding pressure is believed to be especially reflective of the properties of a good medium. This characteristic allows redistribution of the medium both within and to and from the vessel; it enables control of the absolute level and variability of the pressure. And tests show it is that which distinguishes the materials of the present media from those which have been used heretofore, for example, in the pressure pad molding technique. The flowability property can inferentially be seen to be analogous to viscosity. But there is no evident standard test known for measuring this property of importance to the invention and therefore a test apparatus was created as described above comprised of a cylinder having a downwardly movable piston to test the polymer portion of the medium. The cylinder is filled with the rubber or other medium being tested. A replaceable pipe extends from the side of the cylinder and discharges rubber onto a weighing scale, the weight being recorded as a function of time and the pressure applied to the rubber as measured by a transducer. The pipe is a smooth stainless steel tube of 1.1 cm inside diameter and nominally 32-64 RMS (root mean square) surface finish. The pipe length is chosen as desired, with 7.6 cm and 15.2 cm being preferred.

Thus, generally it can be said that the medium will have flowability, i.e., mass transport can occur when molding pressures are applied. The preferred medium, when tested in the apparatus described above using 10.3 MPa and a 15 cm pipe, has a flow rate of at least 0.6 gram per second (g/s), typically 6 g/s, and desirably 25 g/s. Further description of the low temperature polymer portion of the dual medium system is given below. A particulate elastomer is typically used in the practice of the invention. When the 8017 polymer is used as particulate solids, prior to the application of pressure the particulates are spaced apart at the article precursor surface. But when pressure is applied, the particles self-comply and coalesce into a continuous void-free body. Because of this and their inherent resilience, a substantially uniform hydraulic-like pressure is applied to the article precursor surface. Tests show that the 8017 material without a metal additive will tend to coalesce upon the application of moderate compressive pressure, of the order of 70 kPa; at this point the interfacial boundaries between the particles are so essentially conformed that the compresed rubber becomes translucent instead of opaque. The 8017 material has a true density of 0.97 g/cc, an apparent bulk density of 0.5 g/cc as a −30 mesh size powder, and it is compressed to a coalesced translucent material with a density of 0.94–0.97 g/cc by the application of about 70 kPa. (Further compression of captured material, in the range 70 kPa to 13.8 MPa, shows it to have about 0.4% volume change per 10 MPa.) Under the above-described coalesced condition, there is believed to be little void, or gas (except absorbed gas) contained in the interstices between the particulates.

Thus, the preferred material, when used in particulate form, will be self-compliant and will tend to coalesce as an apparent void-free body below a pressure of 350 kPa, preferably 240 kPa; more preferably about 69 kPa.

Based on various molding tests and material property measurement, desirable results have been associated with media having low strength, the ability to self-comply under molding level pressures, and the ability to flow and exhibit hydraulic-like behavior. Other silicone rubbers than 8017 have been used up to the date of this application, and it is within contemplation that there are still other organic polymers and other materials which are either known or can be developed which will carry out the essential features of the invention. To characterize the desirable properties associated with the good molding results, comparative tests have been run on various rubbers, in molding trials on actual composite articles, in the flow test apparatus described, and in standard apparatus.

Tests run on the granular 8017 material showed a maximum variation in pressure of as low as 2% at about 6.9 MPa nominal pressure; other useful materials produced pressure uniform within 10%.

Having above described the low temperature medium the high temperature medium is now described.

The typical high temperature polymer medium is an unfilled vinylmethylsiloxane-dimethylsiloxane copolymer (VMS-DMS) particulate of −4+30 U.S. mesh sieve size (4.7–0.42 mm), which when pressurized, is sufficiently self-compliant to coalesce as an essentially void-free medium at a pressure of the order of 0.103 to 0.138 MPa (15 to 20 psi).

Typically, a high vinyl content VMS-DMS containing rubber is used as the pressurizing medium. Most preferably, the rubber is an improvement on the low temperature medium identified above. By high vinyl content is meant about 10% to about 100% vinylmethylsiloxane. Exemplary VMS-DMS compositions are described in U.S. Pat. No. 4,581,391 assigned to the U.S.A., the disclosure of which is hereby incorporated by reference. These vinyl siloxanes may be produced by conventional commercial procedures. It is especially preferred that a vinyl siloxane having about 40% to about 60% vinyl groups is used because they remain elastomeric at higher temperatures (e.g. about 454° C. to about 482° C.). A preferred material which has been used thus far is the experimental unfilled vinyl siloxane material designated as No. 8026 by the Dow Corning Corporation (Midland, Mich.).

Other Dow Corning vinyl polymers Nos. 8800, 8801, 8024 and 8025 are also useful. The QCII-1010X polyvinyl-methylsiloxane (Quantum Company, Michigan) is also useful with the present invention.

While the preferred materials are VMS-DMS rubbers (elastomers) other polymer materials having the desired characteristics can be used. For example, methylphenysiloxane (MPS), vinylmethylsiloxane containing thermal stabilizers and silphenylene have excellent high temperature and flow properties. Fillers and other adulterants (such as metal particulates) can be included with and within the medium, provided the essential behavior properties (e.g. flowable) are maintained.

In a similar fashion to the preferred low temperature medium the preferred high temperature medium (vinyl siloxane rubber) is characterized by low strength and high friability.

The preferred X5-8026 material has a Shore A hardness of less than 15 and compressive strength of the order of 3 MPa when measured on a 2.5 cm square by 1.27 cm thick specimen, and upon a compression deformation of about 40 percent it shears into smaller particles. Again the preferred polymer 8026 (like the low temperature medium) useful with the present invention when forced through a small orifice, or through a 1.1 cm diameter pipe as described below, has a tendency to disintegrate into smaller particulate. By example, it is found that over time a nominal 30 mesh size powder having about 50 weight percent retained on a 40 mesh screen will change to one having only about 25 weight percent retained on a 40 mesh screen.

In one embodiment of the invention, the polymer has a Shore A hardness of less than about 15, and desirably less than 10; the compressive strength is less than 0.345 MPa (50 psi), and desirably less than 0.207 MPa (30 psi).

Again, the high temperature medium is characterized by its ability to flow. Thus, generally it can be said that the medium will have flowability, i.e., mass transport can occur when molding pressures are applied. The preferred medium, when tested in the apparatus described above using 10.3 MPa and a 15.2 cm pipe, has a flow rate of at least 0.6 g/s, typically 6 g/s, and desirably 25 g/s.

As with the low temperature medium the high temperature medium particles self-comply and coalesce into a continuous void-free body. Because of this and their inherent resilience, a uniform hydraulic-like pressure is applied to the article precursor surface. Tests show that the 8026 material will tend to coalesce upon the application of moderate compressive pressure, of the order of 125-150 kPa; at this point the interfacial boundaries between the particles are so essentially conformed that the compressed rubber becomes translucent instead of opaque. The 8026 material has a true density of 0.97 g/cc, an apparent bulk density of 0.5 g/cc as a −30 mesh size powder, and it is compressed to a coalesced translucent material with a density of 0.90-0.97 g/cc by the application of about 150 kPa (21.8 psi). (Further compression of captured material, in the range 150 kPa (21.8 psi) to 13.8 MPa (2000 psi), shows it to have abour 0.4% volume change per 10 MPa (1450 psi).) Under the above-described coalesced condition, there is believed to be little void, or gas (except absorbed gas) contained in the interstices between the particulates.

Thus, the preferred material, when used in particulate form, will be self-compliant and will tend to coalesce as an apparent void-free body below a pressure of 250 kPa, preferably 150 kPa; more preferably about 100 kPa.

In addition to the above-described properties, the high temperature medium (unlike the low temperature) medium is capable of flowing at temperatures and pressures in excess of about 316° C. (600° F.) and 0.689 MPa (100 psi), respectively. By capable of flowing is meant providing essentially uniform isostatic pressure. This facilitates molding at the higher temperatures that carbon-carbon composites require. Specifically, the vinyl silanes having about 40% to about 60% vinyl groups are capable of flowing at temperatures below room temperature to about 538° C. (1000° F.) at pressures of about 0.689 MPa (100 psi) to about 20.682 MPa (3000 psi). It is believed that pressures up to 20,000 psi can be used.

Another property characterizing the high temperature medium and differentiating it from the low temperature medium is that the medium is substantially thermally stable for use at temperatures in excess of about 316° C. (600° F.). By substantially thermally stable is meant the medium remains sufficiently flexible (elastic) to transmit molding pressure to an article during its entire cure cycle. Thus as temperatures in excess of about 482° C. (900° F.), the polymer can still function as a load transfer medium. It is critical that at these temperatures, the polymer must be chemically stable such that it will not revert (depolymerize) resulting in oily residue as these oils are very intrusive and can contaminate the article being molded (e.g. resin containing composite). These polymers may give off small amounts of decomposition products which may be removed by a suitable gas vent in the pressure vessel. This property facilitates processing (molding) at the higher temperatures that carbon-carbon composites require. Mediums that are not stable above these temperatures do not work in the present invention as they revert to oily monomers or decompose. Alternatively, portions of the polymer may be transformed (e.g. pyrolyzed) to a hardened state and even upon being ground are not flowable. The pyrolyzed polymer, however, will transmit molding pressure to an article if sufficient unpyrolyzed material remains to back it up.

Specifically, the vinyl silanes having about 40% to about 60% vinyl groups are capable of transmitting molding pressure at temperatures up to about 649° C. (1200° F.) at pressures of about 0.682 MPa (100 psi) to about 20.68 MPa (3000 psi). It is also believed that pressures as high as about 137.88 MPa (20,000 psi) will work.

The high temperature medium also has a high thermal insulative capability which is used in this invention to protect the lower temperature medium from thermal degradation.

Silicone rubbers other than 8026 have been used up to the date of this application, and it is within contemplation that there are still other organic polymers and other materials which are either known or can be developed which will carry out the essential features of the invention. To characterize the desirable properties associated with the good molding results, comparative tests have been run on various rubbers, in molding trials on actual composite articles, in the flow test apparatus described, and in standard apparatus.

As with the low temperature material an even pressure on various points of the article to be molded is important. Comparative tests run on the granular 8026 material showed a maximum variation in pressure of as low as 350 kPa (0.35 MPa) (51 psi) typically less than about 210 kPa (0.21 MPa) (31 psi) at about 6.9 MPa (1000 psi) nominal pressure; other useful materials produced pressure uniform with 10%.

The low and high temperature media have only been characterized according to the properties of some currently available materials; the data are insufficient to establish that the totality of measured properties in combination are necessary. On the contrary, to a significant extent it is believed there is a redundancy and that they independently characterize the invention.

The invention has been described in terms of the molding of a composite polymer material (e.g. conventional epoxy, polyimide, polybenzimidazole (PBI),bis-maleimide (BMI) and even polyetheretherketone (PEEK) and polysulfone resins, etc. filled with conventional glass fiber, graphite fiber, etc.), but it should be evident that the invention will be equally applicable to the molding of other polymer materials, laminates, and to the processing of articles made of other materials, including metals (such as conventional powder metal preforms, e.g. aluminum) and ceramics. The term molding as used herein is intended to embrace all material processing in which pressure is applied to the surface of the material. This invention is particularly useful for carbon-carbon composites as described in commonly assigned copending U.S. application Ser. No. 907,942 entitled "Method for Molding a Carbon-Carbon Composite", the disclosure of which is hereby incorporated by reference.

Generally, any barrier layer can be used that mechanically separates the media. It is preferred that the barrier layer is compliant, chemically compatible with the media and is able to withstand the localized thermal conditions. The barrier layer can be either porous or impervious, depending on whether it is desired to allow gases to pass from one medium to the next. In some instances, it may be desirable to allow decomposition gases to travel through the pressurizing system, other instances will require isolation of gaseous products to prevent adverse reactions within a sensitive medium. Examples of impervious barriers would be aluminum foil or TEFLON TM film (DuPont De Nemours Inc., Wilmington, Del.). Examples of porous materials would include Nomex TM (polyamide) paper (DuPont), closely woven glass fabric, and ARMALON TM (TEFLON TM coated glass scrim cloth) (DuPont).

The pressure vessel used can be virtually anything that can provide support and/or structural support to the medium and/or article. Thus, it can be a metal vessel (e.g. stainless steel, alloy steel) or even a vacuum bag in combination with a tool. In other words, the pressure vessel is an article(s) that contains the article to be molded.

While the invention has been described in terms of a closed vessel, it will be evident that the principles of the method of the invention will permit other variations. For instance, an article may be molded in situ; as when a lining is molded within a rocket motor case. And the invention may be used in other situations where there is not a closed vessel, per se, such as when the medium is captured in a die or tool cavity during compression molding. For example, an upper female die envelops a lower male die which has a cavity that receives and shapes the article precursor. Silicone rubber medium fills the space above the article precursor within the female die. When the opposing pistons move the dies together the medium volume is changed, it is thus pressurized, and the article is molded. Thus, generally, the invention will be applicable to diverse molding situations.

EXAMPLE

A FM 5064 G prepreg, U.S. Polymeric (Santa Ana, Calif.) containing 34% by weight USP 39 phenolic resin available from U.S. Polymeric, and 66% by weight woven graphite fabric and carbon filler was laid up and debulked on three sides of a square molding tool. The article was covered with a layer of TEFLON coated glass (ARMALON) fabric available from T.M.I., Inc. (Salt Lake City, Utah) and one layer of Style 1581 glass fabric (bleeder), available from T.M.I., Inc. in communication with a vacuum vent. A layer of aluminum foil 0.018 mm (0.0007 inch thick) was placed over the glass fabric, stopping short of the vent. Then a second layer of glass fabric was placed over the aluminum foil and vent to form a "breather" layer to aid in the removal of volatiles. A final covering of three layers of aluminum foil was placed over the assembly and taped to the mandrel.

The prepared mold assembly was placed into a pressure vessel for processing. An aluminum foil cylinder, providing approximately a 3.8 cm (1.5 inch) radial clearance around the article, was placed into the vessel. The tube was then carefully filled with 8026 medium. The cylindrical tube was supported by a tooling disc at the base of the mold mandrel. When sufficient medium was introduced into the tube, the foil was squeezed and flatened to form the medium into an essentially uniformly thick blanket. The foil barrier was then surrounded with 8017 medium.

Heating was provided to the tool/mold assembly to properly cure the article. Heating and cooling were also provided to a control coil to maintain the desired pressure conditions.

The article was processed through a continuous "one-step" cycle. That is, the cure cycle was immediately followed with a post-cure and a carbonization step. The article was never removed from the tooling between steps, as is usually done. Cure, post-cure, and carbonization cycles are as follows:

| Temperature (°F.) | Time (Minutes) |
|---|---|
| 97 | 0 |
| 180 | 60 |
| 180 | 90 |
| 240 | 150 |
| 240 | 180 |
| 310 | 240 |
| 310 | 360 |
| 350 | 420 |
| 350 | 540 |
| 500 | 720 |
| 500 | 780 |
| 550 | 840 |
| 550 | 900 |
| 700 | 1080 |
| 700 | 1140 |
| 750 | 1200 |
| 750 | 1260 |
| 1000 | 1560 |
| 1000 | 1620 |

A stepped cycle as follows was also used for the medium pressure.

| Pressure (psi) | Time (Minutes) |
|---|---|
| 50 | 0 |
| 50 | 60 |
| 1000 | 75 |
| 1000 | 1635 |
| 0 | 1650 |

Full vacuum (26 inches Hg) was drawn on the tool through the bleeder/breather layers from the beginning.

The above example resulted in a part with a specific gravity of 1.28 whereas conventional carbonized articles would have a specific gravity less than 1.2.

This method makes a significant advance in the field of molding by providing a system using a combination of pressurizing polymer media. Thus, the thermal stability and high insulative capability of one medium can be used to protect a second medium from thermal degradation. By utilizing two different pressurizing media provides greater flexibility to molding systems.

It should be understood that the invention is not limited to the particular embodiment shown and described herein, but that various changes and modifications may be made without departing from the spirit or scope of this concept as defined by the following claims.

I claim:

1. A method of molding an article from an article precursor at elevated temperatures and pressures comprising:
   (a) disposing said article precursor within a pressure vessel;
   (b) disposing a first solid flowable particulate polymer medium that is substantially thermally stable at temperatures in excess of about 316° C. so that said first polymer is capable of transferring a substantially uniform, predetermined medium pressure to the surface of said article precursor;
   (c) disposing a second solid flowable particulate polymer medium that is less thermally stable than said first solid flowable polymer medium so that said second polymer is capable of causing a substantially uniform, predetermined mediium pressure to the first solid flowable particulate polymer medium;

(d) causing said second medium to produce a substantially uniform predetermined medium pressure to be applied to said first solid flowable polymer medium so that said first solid flowable polymer medium applies a substantially uniform, predetermined medium pressure to the surface of the article precursor; and (e) exposing said article precursor to temperature in excess of about 316° C.;

whereby said second polymer medium is protected from thermal degradation by said first polymer medium.

2. The method as recited in claim 1 wherein said first polymer medium comprises a solid, flowable, particulate silicone rubber having a nominal flow rate of at least 0.6 gram/second through a 1.1 cm diameter pipe 7.6 cm long under applied pressure of 10.34 MPa at room temperature.

3. The method as recited in claim 2 wherein said first polymer medium comprises a vinylmethylsiloxanedimethylsiloxane having about 40% to about 60% vinyl content.

4. The method as recited in claim 1 wherein said second polymer medium comprises a solid, flowable, particulate silicone rubber having a nominal flow rate of at least 0.6 gram/second through a 1.1 cm diameter pipe 7.6 cm long under applied pressure of 10.34 MPa at room temperature.

* * * * *